United States Patent
Lee et al.

(10) Patent No.: US 8,611,041 B2
(45) Date of Patent: Dec. 17, 2013

(54) SERVO CONTROL METHOD AND APPARATUS IN SEEK RETRY CONDITION AND DISK DRIVE APPARATUS USING THE SAME

(75) Inventors: Nam-hoon Lee, Suwon-si (KR); Jae-hyeong Kim, Yongin-si (KR)

(73) Assignee: Seagate Technology International, Cupertino, CA (US)

( * ) Notice: Subject to any disclaimer, the term of this patent is extended or adjusted under 35 U.S.C. 154(b) by 1471 days.

(21) Appl. No.: 11/843,095

(22) Filed: Aug. 22, 2007

(65) Prior Publication Data

US 2008/0088966 A1    Apr. 17, 2008

(30) Foreign Application Priority Data

Aug. 22, 2006  (KR) ........................ 10-2006-0079467

(51) Int. Cl.
  *G11B 5/596*   (2006.01)
  *G11B 21/02*   (2006.01)
(52) U.S. Cl.
  USPC ................. 360/78.09; 360/75; 360/78.06
(58) Field of Classification Search
  None
  See application file for complete search history.

(56) References Cited

U.S. PATENT DOCUMENTS

| | | | |
|---|---|---|---|
| 5,663,846 A | 9/1997 | Masuoka et al. | |
| 5,696,646 A * | 12/1997 | Satoh | 360/78.04 |
| 6,754,019 B2 * | 6/2004 | Tokizono et al. | 360/53 |
| 7,046,475 B2 * | 5/2006 | Hosokawa | 360/75 |
| 7,113,363 B2 * | 9/2006 | Saito | 360/78.04 |
| 7,382,570 B1 * | 6/2008 | Li et al. | 360/78.06 |
| 2002/0054451 A1 | 5/2002 | Moon et al. | |
| 2005/0144376 A1 * | 6/2005 | Jun | 711/112 |

FOREIGN PATENT DOCUMENTS

| | | |
|---|---|---|
| JP | 09-091901 | 4/1997 |
| JP | 2001-67765 | 3/2001 |
| KR | 2002-53509 | 7/2002 |
| KR | 2006-65994 | 6/2006 |

OTHER PUBLICATIONS

Korean Office Action dated Jun. 26, 2007 issued in KR 2006-79467.

* cited by examiner

*Primary Examiner* — K. Wong
(74) *Attorney, Agent, or Firm* — Hall Estill Attorneys at Law

(57) ABSTRACT

A servo control method in a seek retry condition includes determining whether the seek retry condition is generated, and terminating a servo control process that is currently performed and decelerating a voice coil motor such that a speed of the voice coil motor is minimized using a back electromotive force when the seek retry condition is generated.

17 Claims, 4 Drawing Sheets

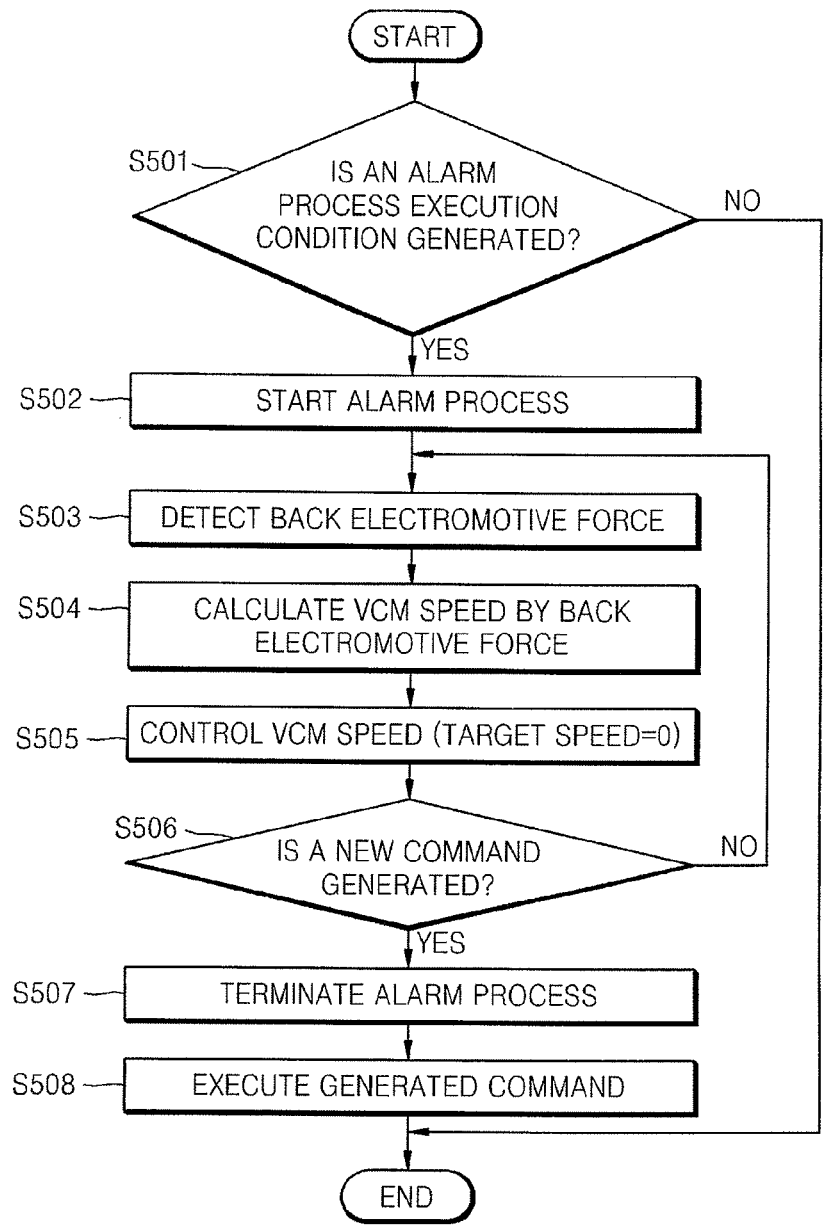

SERVO CONTROL METHOD AND APPARATUS IN SEEK RETRY CONDITION AND DISK DRIVE APPARATUS USING THE SAME

CROSS-REFERENCE TO RELATED APPLICATIONS

This application claims priority under 35 U.S.C. §119(a) from Korean Patent Application No. 10-2006-0079467, filed on Aug. 22, 2006, in the Korean Intellectual Property Office, the disclosure of which is incorporated herein in its entirety by reference.

BACKGROUND OF THE INVENTION

1. Field of the Invention

The present general inventive concept relates to a method and apparatus of controlling a disk drive apparatus, and more particularly, to a servo control method and apparatus capable of fast, reliable seek retry.

2. Description of the Related Art

Korean Patent Publication No. 2002-53509 and US Patent Publication No. 2002-054451 disclose technology related to a hard disk drive. Korean Patent Publication No. 2002-53509 discloses a circuit and method for stably parking a head in a disk drive using back electromotive force. US Patent Publication No. 2002-054451 discloses technology for measuring the back electromotive force of a voice coil motor in a disk drive and controlling the speed of the voice coil motor without a servo signal.

When the disk drive cannot continue seeking or following a track, the disk drive moves a head to a parking zone and tries again to seek the target track. Accordingly, the conventional technology suffers from high access time.

SUMMARY OF THE INVENTION

The present general inventive concept provides a servo control method and apparatus in a seek retry condition to stably float a head above a disk without parking the head when a condition prevents normal seek or track following, and a disk drive using the same.

Also, the present general inventive concept provides a computer-readable recording medium recording a program to execute the method in a computer.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a servo control method in a seek retry condition may include determining whether the seek retry condition is generated, and terminating a servo control process that is currently performed and decelerating a voice coil motor such that a speed of the voice coil motor is minimized using a back electromotive force when the seek retry condition is generated.

The terminating of the servo control process and the decelerating of the voice coil motor may include terminating the servo control process that is currently performed and detecting the back electromotive force of the voice coil motor when the seek retry condition is generated, calculating the speed of the voice coil motor using the back electromotive force detected in the terminating of the servo control process and the detecting of the back electromotive force of the voice coil motor, and generating a deceleration current to reduce the speed of the voice coil motor calculated in the calculating of the speed of the voice coil motor to a predetermined speed and supplying the deceleration current to the voice coil motor.

The foregoing and/or other aspects and utilities of the present general inventive concept may also be achieved by providing a servo control apparatus in a seek retry condition may include a back electromotive force measurement unit to measure a back electromotive force generated in a voice coil motor, and a controller to terminate a servo control process that is currently executed when the seek retry condition is generated, and to terminate the voice coil motor to minimize a speed of the voice coil motor based on the back electromotive force measured by the back electromotive force measurement unit.

The foregoing and/or other aspects and utilities of the present general inventive concept may also be achieved by providing a disk drive apparatus may include a disk to store information, a head to write or read information on the disk, a voice coil motor to move the head, a back electromotive force measurement unit to measure a back electromotive force generated by the voice coil motor, and a controller terminating a servo control process that is currently executed when a seek retry condition is generated and decelerating the voice coil motor to minimize a speed of the voice coil motor based on the back electromotive force measured by the back electromotive force measurement unit.

The controller may calculate the speed of the voice coil motor from the back electromotive force value measured by the back electromotive force measurement unit and generates a control signal to reduce the calculated speed of the voice coil motor to a predetermined speed.

The back electromotive force measurement unit may comprise a sensing resistor connected in series with a coil of the voice coil motor and detecting a current flowing in the coil, and an amplifier amplifying a voltage across the sensing resistor and measuring the back electromotive force with a voltage value output from the amplifier.

The foregoing and/or other aspects and utilities of the present general inventive concept may also be achieved by providing a computer-readable recording medium having embodied thereon a computer program to execute a servo control method in a seek retry condition.

The foregoing and/or other aspects and utilities of the present general inventive concept may also be achieved by providing a servo control apparatus usable in a hard disk drive apparatus, including a voice coil to drive a transducer with respect to a disk, a controller to control the voice coil according to a first servo control process in a normal tracking condition and according to a second servo control process using a back electromotive force of the voice coil in a seek retry condition.

The foregoing and/or other aspects and utilities of the general inventive concept may also be achieved by providing a disk drive apparatus including a disk, a head to write information to the disk and to read information from the disk, wherein the head is floated above the disk without moving the head to a parking zone when a seek retry condition exists.

The foregoing and/or other aspects and utilities of the general inventive concept may also be achieved by providing a method of operating a disk drive apparatus, the method including writing information to a disk and reading information from the disk by a head, and floating the head above the disk without moving the head to a parking zone when a seek retry condition exists.

The foregoing and/or other aspects and utilities of the general inventive concept may also be achieved by providing a method of controlling a servo of a disk drive apparatus, the method including detecting when a seek retry condition exists in the disk drive apparatus and floating a head of the disk drive apparatus above a disk without moving the head to a parking zone in response to the detection of the seek retry condition.

The foregoing and/or other aspects and utilities of the general inventive concept may also be achieved by providing a disk drive system including one or more disks, a head unit to write information to the one or more disks and to read information from the one or more disks and a controller to detect a seek retry condition and to float the head unit above the one or more disks without moving the head to a parking zone when the seek retry condition is detected.

BRIEF DESCRIPTION OF THE DRAWINGS

These and/or other aspects and utilities of the present general inventive concept will become more apparent by describing in detail preferred embodiments thereof with reference to the attached drawings in which:

FIG. 5 is a flow chart illustrating the servo control method in a seek retry condition according to an embodiment of the present general inventive concept.

DETAILED DESCRIPTION OF THE PREFERRED EMBODIMENTS

Figure 1:
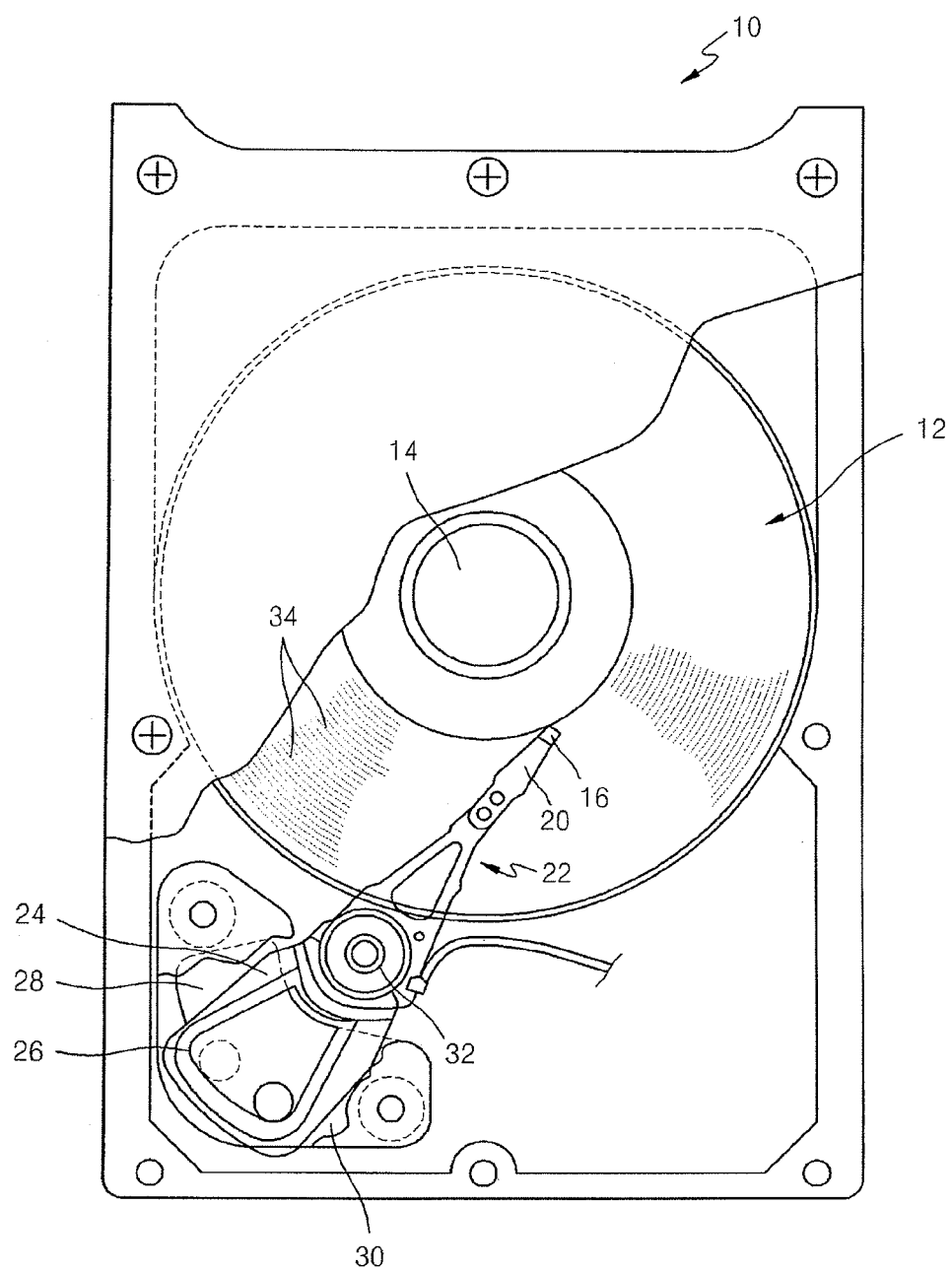
FIG. 1 is a plan view of a head disk assembly of a disk drive apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

A hard disk drive apparatus (HDD) is a combination of a head disk assembly (HDA) formed of mechanical units and an electronic circuit. FIG. 1 illustrates a configuration of an HDA 10 of an HDD to which the present general inventive concept is applied. Referring to FIG. 1, the HDA 10 includes at least one magnetic disk 12 rotated by a spindle motor 14. The HDD includes a transducer 16 located close to the surface of the disk 12.

The transducer 16 can read or write information on the disk 12 by detecting a magnetic field of the disk 12 or magnetizing the disk 12. The transducer 16 is typically associated with the surface of the disk 12. Although the transducer 16 is described as a single transducer, it should be understood that the transducer 16 may include of a write transducer to magnetize the disk 12 and a read transducer to detect the magnetic field of the disk 12. The read transducer is formed of a magneto-resistive (MR) device. The transducer 16 is typically referred to as a head.

The transducer 16 can be integrated into a slider 20. The slider 20 generates an air bearing between the transducer 16 and the surface of the disk 12 and is coupled to a head gimbal assembly 22. The head gimbal assembly 22 is attached to an actuator arm 24 having a voice coil 26. The voice coil 26 is located within a magnetic assembly 28 to define a voice coil motor (VCM) 30. Current supplied to the voice coil 26 generates torque to rotate the actuator arm 24 about a bearing assembly 32. The rotation of the actuator arm 24 moves the transducer 16 across the surface of the disk 12.

Figure 2:
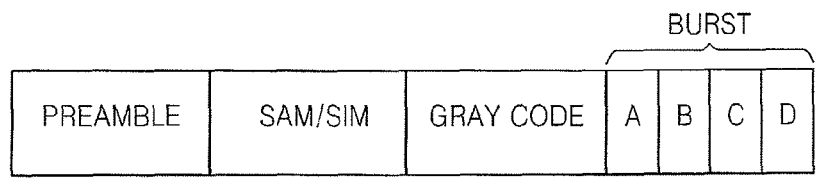
FIG. 2 illustrates a pattern of servo information recorded on a disk of a general hard disk drive apparatus according to an embodiment of the present general inventive concept.

Information is typically stored in a plurality of circular tracks 34 on the disk 12. Each of the tracks 34 generally includes a plurality of sectors. Each of the sectors includes a servo sector and a data sector. Servo signals including a preamble, a servo address/index mark (SAM/SIM), a gray code, and burst signals A, B, C, and D are recorded in the servo sector as illustrated in FIG. 2. The preamble is provided to set clock sync and variable gain. The servo address mark SAM indicates the start of the servo sector and the servo index mark SIM provides information on the rotation of the disk. The gray code provides track information and sector information. The burst signals A, B, C, and D are used to control the position of the head.

Figure 3:
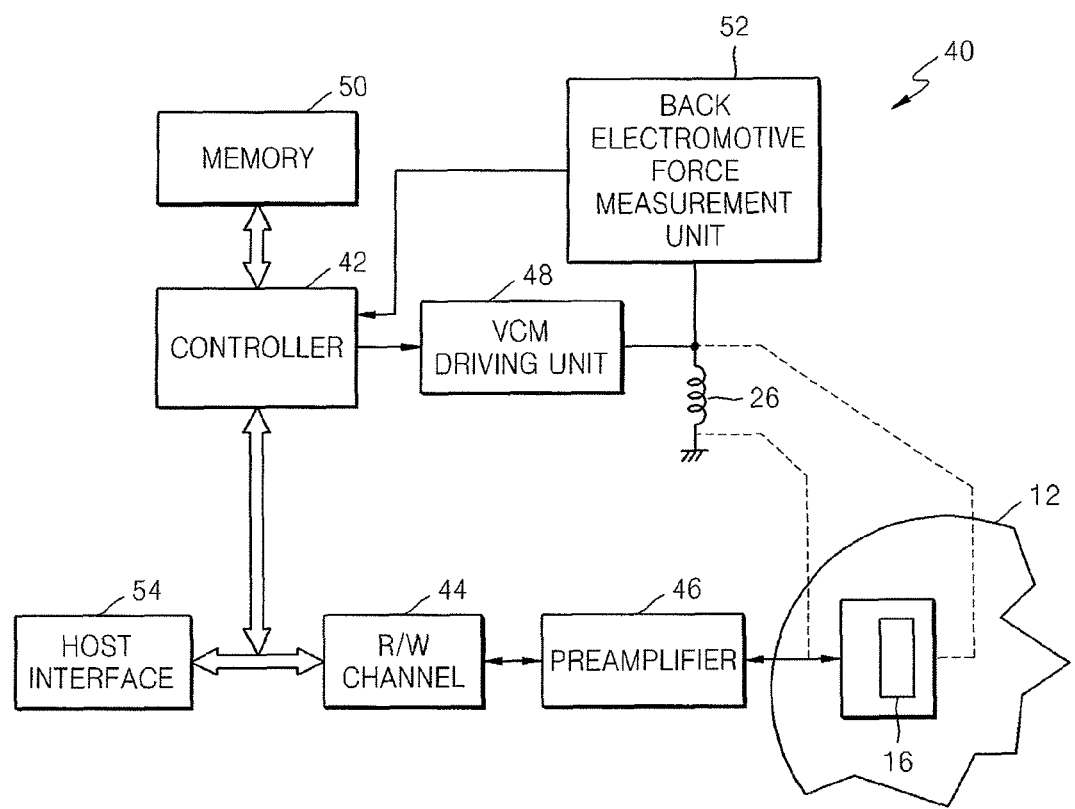
FIG. 3 is a block diagram of a disk drive apparatus to which a servo control method and apparatus in a seek retry condition is applied according to an embodiment of the present general inventive concept.

FIG. 3 illustrates an electronic system 40 that controls an HDD. The electronic system 40 includes a controller 42 that is connected to a transducer 16 via a read/write (R/W) channel circuit 44 and a pre-amplifier circuit 46. The controller 42 may be a digital signal processor (DSP), a microprocessor, or a microcontroller. The controller 42 controls the read/write channel circuit 44 to read information from a disk 12 or write information to the disk 12. The controller 42 generates a sector pulse that indicates a position to write or read data in a data write and data read mode and a servo gate pulse to obtain a servo mark address signal.

The controller 42 is connected to a voice coil motor (VCM) driving unit 48 that supplies drive current to a voice coil 26. The controller 42 supplies a control signal to the VCM driving unit 48 to control the excitation of a voice coil motor 30 (FIG. 1) and the movement of the transducer 16. Also, when a seek retry condition prevents normal seek or track following, the controller 42 executes an alarm process according to a flow chart illustrated in FIG. 5.

A memory 50 contains firmware, various control data used to control the HDD, and programs to execute the flow chart of FIG. 5.

In the operation of a general disk drive apparatus, in a data read mode, the preamplifier circuit 46 amplifies an electrical signal detected by the transducer 16 from the disk 12. Then, the read/write channel circuit 44 encodes the electrical signal from the preamplifier circuit 46 into a digital signal according to a timing of a sector pulse to read, generated by the controller 42, converts the digital signal to stream data, and transmits the stream data to a host device (not illustrated) via a host interface circuit 54.

In a write mode, the disk drive apparatus receives data from the host device via the host interface circuit 54 and temporarily stores the data in an internal buffer (not illustrated) of the host interface circuit 54. The disk drive apparatus sequentially outputs the data stored in the internal buffer so that the read/write channel circuit 44 converts the data to binary data stream suitable for a write channel of the disk 12. Then, a write current amplified by the preamplifier circuit 46 is written on the disk 12 through the transducer 16 at a point when a sector pulse to write is generated.

Figure 4:
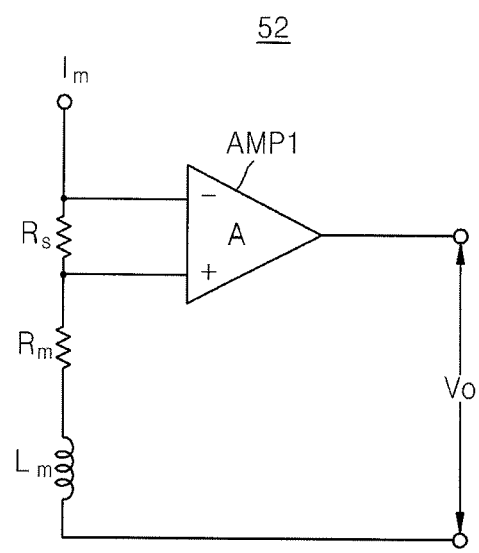
FIG. 4 is a circuit diagram of a back electromotive force detection unit of FIG. 3.

A back electromotive force measurement unit 52 will now be described in detail with reference to FIG. 4, which is a circuit diagram of the back electromotive force measurement unit 52. In FIG. 4, Rm and Lm respectively indicate a resistance and inductance of a voice coil motor, and Rs represents a sensing resistance to detect a current Im flowing in the voice coil motor. An amplifier AMP1 amplifies the voltage across the sensing resistance Rs, using a variable gain A.

A voltage Vvcm applied to the voice coil motor is expressed by Equation 1.

$$Vvcm = Lm \times dIm/dt + Rm \times Im + Vbemf \quad \text{[Equation 1]}$$

In Equation 1, V_bemf indicates a voltage generated by the back electromotive force of the voice coil motor. Accordingly, an output voltage Vo of the back electromotive force measurement unit 52 is expressed by Equation 2.

$$Vo = (Lm \times dIm/dt + Rm \times Im + Vbemf) - A \times Rs \times Im \quad \text{[Equation 2]}$$

Assuming that the current Im flowing in the voice coil motor is constant at the point when the back electromotive force is measured, Equation 2 is expressed by Equation 3.

$$Vo = Rm \times \text{Im} + Vbemf - A \times Rs \times \text{Im} \quad \text{[Equation 3]}$$
$$= V\_bemf + (Rm/Rs - A) \times \text{Im} \times Rs$$

When the condition Rm/Rs−A=0 is satisfied in Equation 3, the output voltage Vo of the back electromotive force measurement unit 52 is Vbemf. Accordingly, when the gain (A) of the amplifier AMP1 is selected to match the Rm/Rs value, the back electromotive value can be accurately measured.

Next, the servo control operation in an alarm process according to the generation of a seek retry condition using the back electromotive force of a voice coil motor measured by the back electromotive measurement unit 52 will be described with reference to FIG. 5. FIG. 5 is a flow chart illustrating a servo control method in a seek retry condition according to the present general inventive concept.

Referring to FIG. 5, the controller 42 determines whether an alarm process execution condition is generated in the HDD (operation S501). The alarm process execution condition is generated, for example, when a seek or track following is not executed normally. The condition corresponds to a seek retry generation condition.

As a result of the determination in operation S501, when the alarm process execution condition is generated, the controller 42 terminates a control process that is currently executed and starts the alarm process (operation S502). When the alarm process starts, the controller 42 receives an analog back electromotive force voltage signal of the voice coil motor measured by the back electromotive force measurement unit 52, converts the analog signal to a digital signal, and generates digital back electromotive force information (operation S503). In an embodiment of the present general inventive concept, an analog/digital conversion circuit may be added to the back electromotive force measurement unit 52. In this embodiment, the back electromotive force measurement unit 52 may directly generate digital back electromotive force information.

Also, the speed of the voice coil motor is calculated using the digital back electromotive force information generated in operation S503 (operation S504). The relationship such as Equation 4 is established between the back electromotive force Vbemf of the voice coil motor and the angular speed ω of the voice coil motor.

$$Vbemf = Kb \times \omega \quad \text{[Equation 4]}$$

In Equation 4, Kb is a back electromotive force constant. The angular speed ω of the voice coil motor can be calculated by dividing the back electromotive force Vbemf by the back electromotive force constant kb.

Also, the controller 42 controls the speed of the voice coil motor such that the speed of the voice coil motor calculated in operation S504 can be minimized (operation S505). That is, the controller 42 controls deceleration such that the speed of the voice coil motor is zero resulting in the head not moving, for example, to a parking zone, but floats at one position on the disk.

In detail, the controller 42 generates a deceleration control signal to reduce the speed of the voice coil motor calculated by the back electromotive force to "0". When the deceleration control signal of the controller 42 is applied to the VCM driving unit 48, the VCM driving unit 48 generates a deceleration current in a reverse direction corresponding to the deceleration control signal and supplies the deceleration current to the voice coil motor. Accordingly, the speed of the voice coil motor reaches "0".

After the VCM deceleration control by operation S505 is performed, it is determined whether a new command is generated in the HDD (operation S506). Usually a new seek command is generated, according to a retry seek mode. It is possible that a different command may be generated by the host device before the seek command according to the retry seek mode. Accordingly, the new command may be input by the host device.

When no new command is generated as a result of the determination of operation S506, the program is returned to operation S503 and the alarm process, operations S503-S505, is repeated. When a new command is generated, the controller 42 terminates the alarm process (operation S507). Then, the controller 42 executes the new command in the HDD (S508).

As described above, according to various embodiments of the present general inventive concept, since the voice coil motor is controlled to stably float the head at the present position without moving the head to a parking zone in the alarm process according to the generation of the seek retry condition in the HDD, the seek retry time can be shortened. Accordingly, the access time can be reduced during the generation of the seek retry.

The present general inventive concept can be embodied as a method, an apparatus, and a system. Also, the present general inventive concept can be embodied as computer-readable code on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes and code segments to accomplish the present general inventive concept can be easily constructed by programmers skilled in the art to which the present general inventive concept pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A servo control method in a seek retry condition, the method comprising:

determining whether the seek retry condition is generated; and terminating a servo control process that is currently performed and decelerating a voice coil motor such that a speed of the voice coil motor is minimized using a back electromotive force, when the seek retry condition is generated.

2. The method of claim 1, wherein the seek retry condition is generated when seek or track following is not performed normally during seek or track following control.

3. The method of claim 1, wherein the terminating of the servo control process and the decelerating of the voice coil motor comprise:

terminating the servo control process that is currently performed and detecting the back electromotive force of the voice coil motor when the seek retry condition is generated;

calculating the speed of the voice coil motor using the back electromotive force detected in the terminating of the servo control process and the detecting of the back electromotive force of the voice coil motor; and generating a deceleration current to reduce the speed of the voice coil motor calculated in the calculating of the speed of the voice coil motor to a predetermined speed and supplying the deceleration current to the voice coil motor.

4. The method of claim 3, wherein the speed of the voice coil motor is calculated by dividing the detected back electromotive force by a back electromotive force constant.

5. A computer-readable recording medium having embodied thereon a computer program, that, when executed by a computer, provides a servo control method in a seek retry condition, wherein the method comprises:

determining whether the seek retry condition is generated; and terminating a servo control process that is currently performed and decelerating a voice coil motor such that a speed of the voice coil motor is minimized using a back electromotive force, when the seek retry condition is generated.

6. The method of claim 5, wherein the terminating of the servo control process and the decelerating of the voice coil motor comprise:

terminating the servo control process that is currently performed and detecting the back electromotive force of the voice coil motor when the seek retry condition is generated;

calculating the speed of the voice coil motor using the back electromotive force detected in the terminating of the servo control process and the detecting of the back electromotive force of the voice coil motor; and generating a deceleration current to reduce the speed of the voice coil motor calculated in the calculating of the speed of the voice coil motor to a predetermined speed and supplying the deceleration current to the voice coil motor.

7. A servo control apparatus in a seek retry condition, the apparatus comprising:

a back electromotive force measurement unit to measure a back electromotive force generated by a voice coil motor; and a controller to terminate a servo control process that is currently executed when the seek retry condition is generated, and to terminate the voice coil motor to minimize a speed of the voice coil motor based on the back electromotive force measured by the back electromotive force measurement unit.

8. The apparatus of claim 7, wherein the seek retry condition is generated when seek or track following is not performed normally during seek or track following control.

9. The apparatus of claim 7, wherein the controller calculates the speed of the voice coil motor from the back electromotive force value measured by the back electromotive force measurement unit and generates a control signal to reduce the calculated speed of the voice coil motor to "0".

10. The apparatus of claim 9, wherein the speed of the voice coil motor is calculated by dividing the detected back electromotive force by a back electromotive force constant.

11. A disk drive apparatus comprising:

a disk to store information;

a head to write or to read information on the disk;

a voice coil motor to move the head;

a back electromotive force measurement unit to measure a back electromotive force generated by the voice coil motor; and a controller to terminate a servo control process that is currently executed when a seek retry condition is generated and decelerating the voice coil motor to minimize a speed of the voice coil motor based on the back electromotive force measured by the back electromotive force measurement unit.

12. The apparatus of claim 11, wherein the seek retry condition is generated when seek or track following is not performed normally during seek or track following control.

13. The apparatus of claim 11, wherein the controller calculates the speed of the voice coil motor from the back electromotive force value measured by the back electromotive force measurement unit and generates a control signal to reduce the calculated speed of the voice coil motor to a predetermined speed.

14. The apparatus of claim 11, wherein the speed of the voice coil motor is calculated by dividing the detected back electromotive force by a back electromotive force constant.

15. The apparatus of claim 11, wherein the back electromotive force measurement unit comprises:

a sensing resistor connected in series with a coil of the voice coil motor and to detect a current flowing in the coil; and an amplifier to amplify a voltage across the sensing resistor and to measure the back electromotive force with a voltage value output from the amplifier.

16. The apparatus of claim 15, wherein a gain of the amplifier is determined by a ratio of a coil resistance of the voice coil motor to the sensing resistance.

17. A servo control apparatus usable in a hard disk drive apparatus, comprising:

a voice coil to drive a transducer with respect to a disk;

a controller to control the voice coil according to a first servo control process in a normal tracking condition and according to a second servo control process using a back electromotive force of the voice coil in a seek retry condition to minimize the drive of the transducer with respect to the disk by the voice coil.

* * * * *